(12) United States Patent
Yuen et al.

(10) Patent No.: US 8,290,684 B2
(45) Date of Patent: Oct. 16, 2012

(54) FUEL STABILITY METHODS AND SYSTEMS

(75) Inventors: Pui-Kei Yuen, Rochester Hills, MI (US);
Steven P. Kemp, Canton, MI (US);
Andrew E. Buczynksky, Brownstown, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 813 days.

(21) Appl. No.: 12/471,914

(22) Filed: May 26, 2009

(65) Prior Publication Data
US 2010/0300551 A1 Dec. 2, 2010

(51) Int. Cl.
*G06F 19/00* (2006.01)
*F02B 47/04* (2006.01)
*F17D 3/00* (2006.01)

(52) U.S. Cl. ........... 701/102; 123/1 A; 137/3; 137/87.02
(58) Field of Classification Search .................. 123/1 A, 123/198 A, 494, 515; 701/101–103, 114; 137/1, 3, 87.01, 87.02, 101.25, 571, 572; 141/9, 11, 301, 349; 222/56
See application file for complete search history.

(56) References Cited

U.S. PATENT DOCUMENTS

| | | | | |
|---|---|---|---|---|
| 4,936,261 A * | 6/1990 | Naumann et al. | ............. | 123/1 A |
| 5,686,398 A * | 11/1997 | Minokami et al. | ............. | 508/481 |
| 7,216,681 B2 * | 5/2007 | Valentine et al. | ............. | 141/349 |
| 7,270,088 B2 | 9/2007 | Whitehall | | |
| 7,743,737 B2 * | 6/2010 | Valentine et al. | ............. | 123/1 A |
| 8,061,383 B2 * | 11/2011 | Gouzou et al. | ................ | 137/572 |
| 2004/0009379 A1 * | 1/2004 | Amendola et al. | ............. | 429/17 |

FOREIGN PATENT DOCUMENTS

| CN | 101234637 A | 8/2008 |
|---|---|---|
| JP | 04309712 A * | 11/1992 |
| WO | WO 2008132548 A1 * | 11/2008 |

* cited by examiner

*Primary Examiner* — Willis R Wolfe, Jr.
(74) *Attorney, Agent, or Firm* — Cantor Colburn LLP

(57) ABSTRACT

In one exemplary embodiment of the present invention, a fuel stabilizer system is provided. The fuel stabilizer system includes a fuel additive storage unit that stores fuel stability fluid. A fuel stability fluid supply system supplies fuel stability fluid from the fuel additive storage unit to a fuel storage unit. A control module estimates an age of fuel in the fuel storage unit and selectively controls the fuel stability fluid supply system to supply fuel stability fluid to the fuel storage unit based on the age of the fuel.

16 Claims, 4 Drawing Sheets

FUEL STABILITY METHODS AND SYSTEMS

FIELD

Exemplary embodiments of the present invention are related to fuel systems and, more specifically, to methods and systems for maintaining fuel stability in fuel systems.

BACKGROUND

Hybrid electric vehicles (HEV) or Extended-Range Electric Vehicles (EREV) typically include an internal combustion engine and an electric motor which are operable to drive the vehicle. When a driver of the vehicle depresses an accelerator pedal, a control module establishes a driver power command and thereafter controls the engine and/or the electric motor to meet such command.

In a series HEV, the motor provides the primary source of propulsion while the internal combustion engine drives an electric generator. The electric generator both charges batteries in the vehicle and powers the electric motor.

The usage of the internal combustion engine is dependent on the charge of the batteries. In some cases, the internal combustion engine is only used after, for example, so many hours of consecutive use. It is possible for those who only drive short distances to never or very rarely make use of the internal combustion engine in the HEV.

In such cases, stored fuel for the internal combustion engine remains unused for extended periods of time. Storing fuel over an extended period of time can result in deposits in the fuel system, due to the oxidation of the fuel. The deposits can prevent proper operation of the engine.

SUMMARY

In one exemplary embodiment of the present invention, a fuel stabilizer system is provided. The fuel stabilizer system includes a fuel additive storage unit that stores fuel stability fluid. A fuel stability fluid supply system supplies fuel stability fluid from the fuel additive storage unit to a fuel storage unit. A control module estimates an age of fuel in the fuel storage unit and selectively controls the fuel stability fluid supply system to supply fuel stability fluid to the fuel storage unit based on the age of the fuel.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
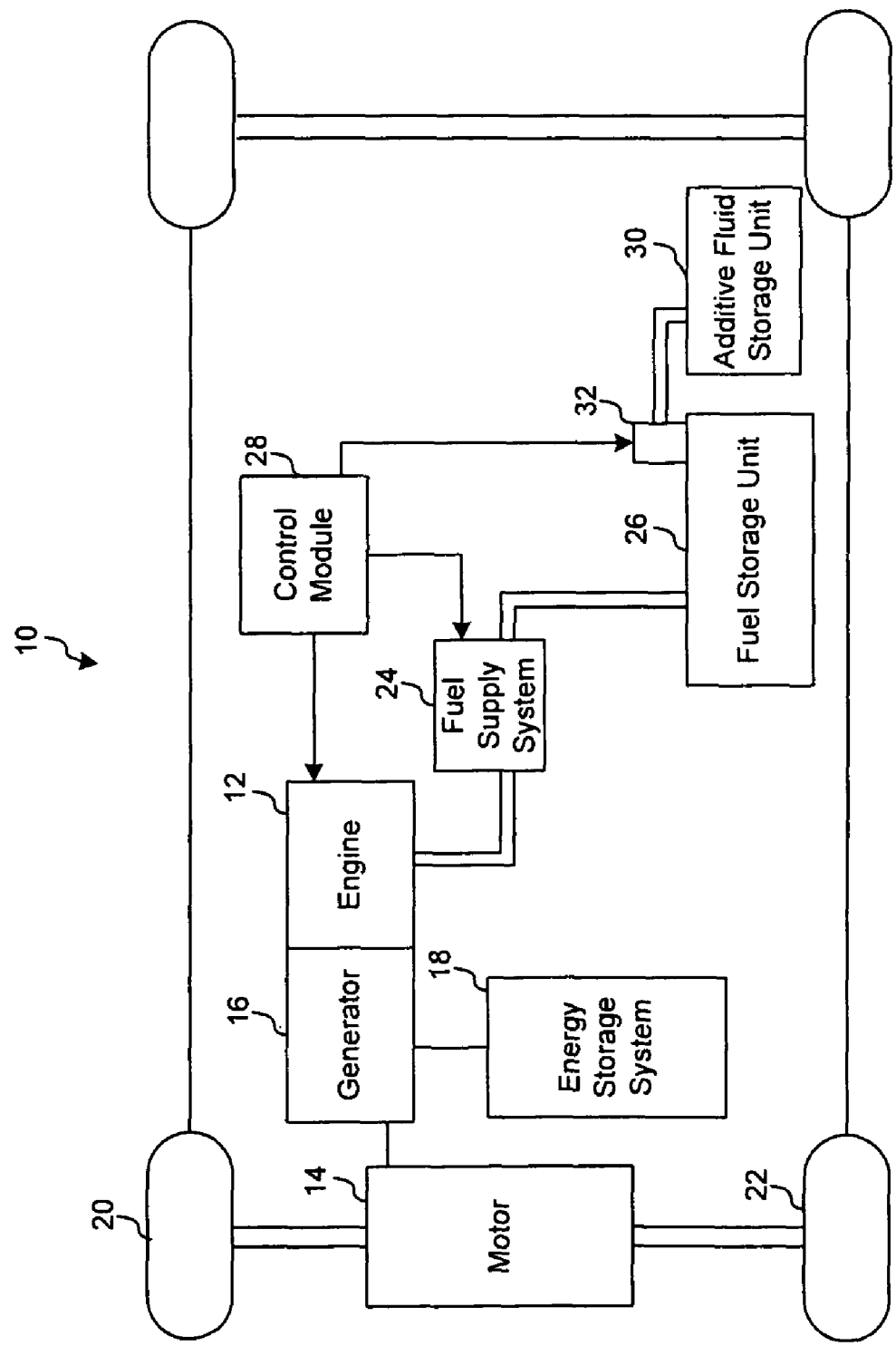
FIG. 1 is a functional block diagram illustrating a hybrid electric vehicle that includes a fuel stability additive system in accordance with an exemplary embodiment.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a block diagram illustrates an exemplary hybrid electric vehicle (HEV) 10 that includes a fuel stability additive system in accordance with an exemplary embodiment. The exemplary HEV 10 includes an engine 12 and an electric motor 14 arranged according to a series configuration. The engine 12 drives a generator 16 to generate electricity. The electricity is stored in an energy storage system 18 (e.g., a plurality of batteries) or is sent to the electric motor 14. The electric motor 14 functions as the primary source of propulsion of the vehicle 10 by driving the wheels 20, 22.

The engine 12 is an internal combustion engine. Air is drawn into cylinders (not shown) of the engine 12 and mixed with fuel. The air/fuel mixture is combusted therein and expelled through an exhaust system (not shown). In various embodiments, the engine 12 of FIG. 1 includes four cylinders. As can be appreciated, the systems and methods of the present disclosure can be implemented in engines having a plurality of cylinders including, but not limited to, 1, 2, 3, 4, 5, 6, 8, 10, and 12 cylinders.

A fuel supply system 24 supplies fuel stored in a fuel storage unit 26 to the engine 12. A control module 28 controls the fuel supply system 24 and/or operations of the engine 12.

A fuel stability additive system according to the present disclosure includes an additive fluid storage unit 30 that stores fuel stability fluid, such as, for example, any suitable fuel stabilizer. Such fuel stabilizers are typically chemical compounds in the classes of hindered phenols, phynylenediamines, hindered amines, amino-ethers, hydroxyl amines, nitroxides, nitrones, and metal deactivators (based on N, N'-disalicylindene-1,2-propanediamine) and mixtures thereof. An additive supply system 32 receives stability fluid from the additive fluid storage unit 30 and supplies the stability fluid into the fuel storage unit 26. In various embodiments, the additive supply system 32 includes a fluid injection device that injects fluid into the fuel storage unit 26. As can be appreciated, the additive supply system 32 can include any supply device known in the art.

The control module 28 determines an age of the fuel residing in the fuel storage unit 26 and controls the additive supply system 32 to supply a certain amount of stability fluid into the fuel storage unit. The stability fluid thus maintains a stability of the fuel during non-use of the engine 12.

Although FIG. 1 illustrates an HEV 10, it can be appreciated that the fuel stability additive system of the present disclosure can be applicable to various applications including an internal combustion engine that may sit unused for various periods of time. Such applications can include, for example, but are not limited to, stationary appliances, marine applications, all-terrain vehicle applications, small-engine applications (e.g., lawn mowers, trimmers, snow-blowers, etc.), and any other application including two- or four-stroke internal combustion engines.

Figure 2:
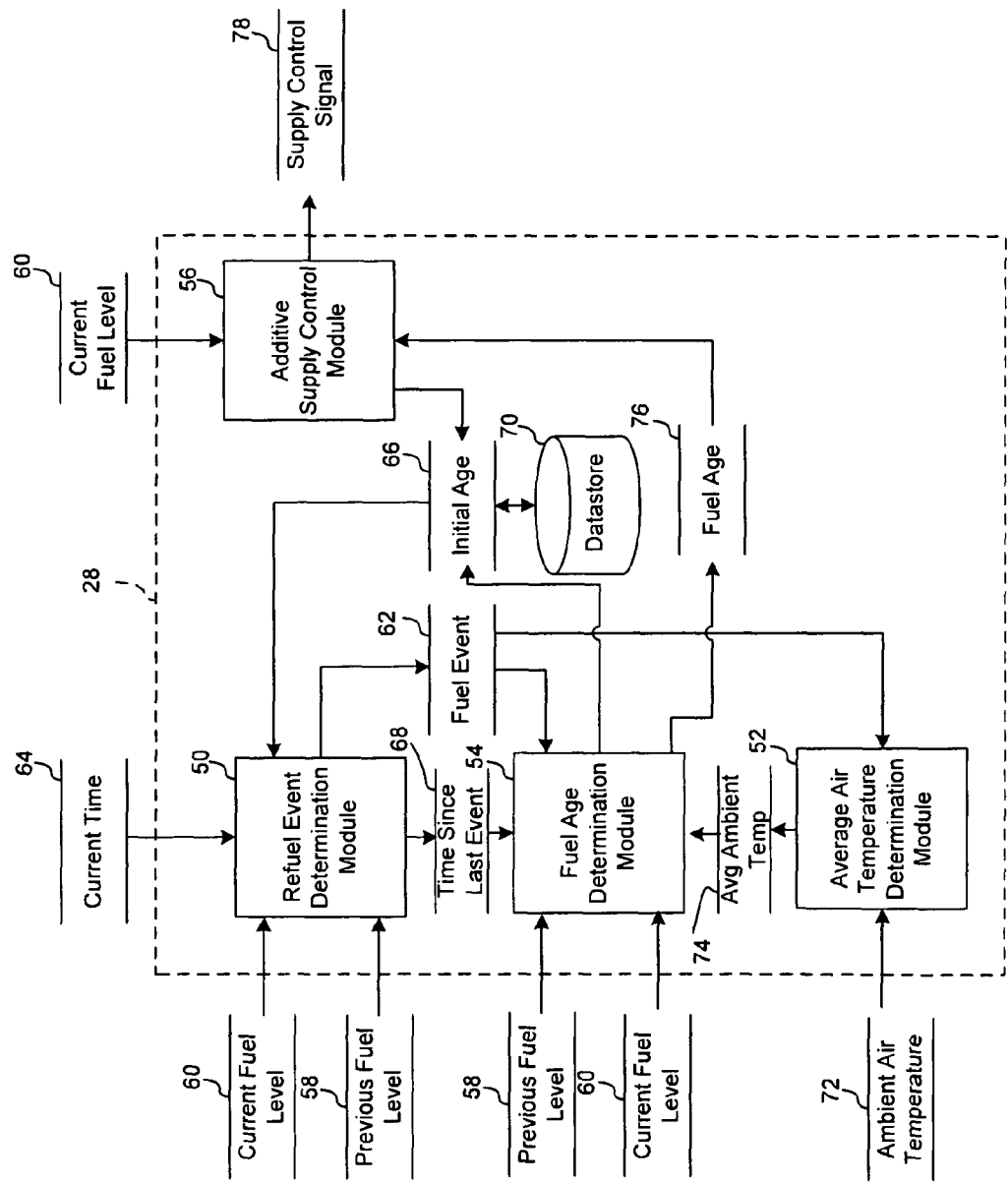
FIG. 2 is a dataflow diagram illustrating a control module of the hybrid electric vehicle in accordance with an exemplary embodiment.

Referring now to FIG. 2, a dataflow diagram illustrates various embodiments of a fuel stability additive control system that may be embedded within the control module 28. Various embodiments of fuel stability additive control systems according to the present disclosure may include any number of sub-modules and/or datastores embedded within the control module 28. As can be appreciated, the sub-modules shown in FIG. 2 can be combined and/or further partitioned to similarly control the supply of the fuel stability fluid to the fuel storage unit 26. Inputs to the system may be sensed from the vehicle 10, received from other control modules (not shown) within the vehicle 10, and or determined by other sub-modules (not shown) with in the control module 28. In various embodiments, as shown in FIG. 2, the control module 28 includes a refuel event determination module 50, an average temperature determination module 52, a fuel age determination module 54, and an additive supply control module 56.

The refuel event determination module 50 receives as input, for example, a previous fuel level 68, and a current fuel level 60. Based on the inputs, the refuel event determination module 50 determines when a refuel event has occurred. For example, when the current fuel level 60 exceeds the previous fuel level 58 (e.g., by a predetermined amount), a refuel event has occurred. The refuel event determination module 50 generates a fuel event indicator 62 based on the refuel event.

In various embodiments, the refuel event determination module 50 further receives as input a current time 64 and an initial age 66. Based on these inputs 64, 66, the refuel event determination module 50 determines a time since the last refuel event 68. In one example, the refuel event determination module 50 determines the time since the last refuel event by adding to the initial age 66 the current time 64. The initial age 66 is updated by the age determination module 54 and/or the additive supply control module 56 (as will be discussed in more detail below) and can be retrieved from a datastore 70 (e.g., a non-volatile datastore). The current time 64 can be generated from an internal clock, for example, of the control module 28.

The average temperature determination module 52 receives as input ambient air temperature 72 and the fuel event indicator 62. The average temperature determination module 52 monitors the ambient air temperature 72. Based on the fuel event indicator 62, the average temperature determination module 52 estimates an average ambient air temperature 74 since the last refuel event.

The fuel age determination module 54 receives as input the average ambient air temperature 74, the fuel event indicator 62, the time since last refuel event 68, the previous fuel level 58, and the current fuel level 60. The fuel age determination module 54 estimates an age of the fuel residing in the fuel storage unit 26 (FIG. 1) (fuel age 76) based on the inputs. For example, the actual age of the fuel is adjusted based on the average ambient air temperature 74, and further adjusted when new fuel is added during a refuel event.

In various embodiments, the fuel age determination module 54 estimates the age of the fuel (FuelAge 76) by calculating an average age (AvAge) based on the time since last refuel event 68 (Time), the average air temperature since the last refuel event 74 (Temp), and the current fuel level 60 (FillLevel). In one example, the fuel age 76 is computed based on the following equation:

$$\text{FuelAge} = \text{AvAge} = k * \text{Time} * \text{Temp} * (100\% - \text{FillLevel}). \quad (1)$$

Where, k is an algorithm constant.

At each refueling event, the fuel age determination module 54 further estimates the age of the fuel by applying a weighted average estimation of the new fuel and the old fuel. In various embodiments, the fuel age determination module 54 estimates the fuel age 76 (Age) based on the weighted average age (WeightedAvAge), which is estimated based on the previous fuel level 58 (FillPrev) and the current fuel level 60 (FillCur). In one example, the fuel age 76 is computed based on the following equation:

$$\text{FuelAge} = \text{WeightedAvAge} = (\text{Fill}_{Prev}/\text{Fill}_{Cur}) * \text{AvAge}. \quad (2)$$

Upon computing the fuel age 76 after the refuel event, the age determination module sets the initial age 66 to the fuel age 76 and stores the initial age 66 in the datastore 70 for later use (as discussed above).

The additive supply control module 56 receives as input the fuel age 76, and the current fuel level 60. The additive supply control module 56 determines when to command the supply of the stability fluid to the fuel storage unit 26 (FIG. 1) and determines an amount of stability fluid to supply into the fuel storage unit 26 (FIG. 1). For example, the additive supply control module 56 monitors the fuel age 76. When the fuel age 76 exceeds a predetermined threshold age (e.g., six months), the stabiligy fluid supply amount is determined based on the current fuel level 60 and the supply control signal 78 is generated based thereon.

When the supply control signal 78 is generated, the additive supply control module 56 further resets the initial age 66 to a predetermined value (e.g., an equivalent of two months, three months, etc.).

Figure 3:
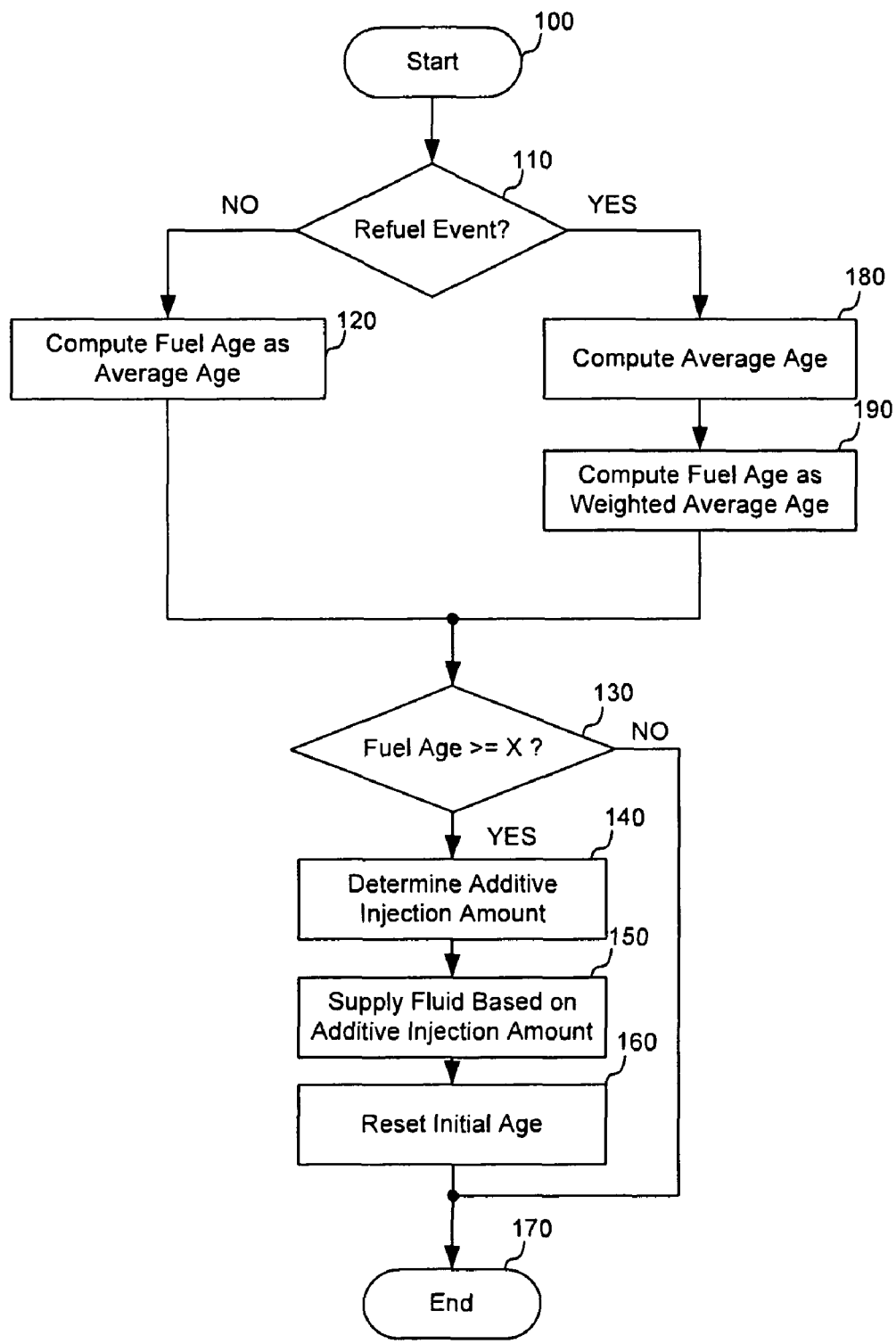
FIGS. 3 and 4 are flowcharts illustrating a fuel additive stability supply control method in accordance with an exemplary embodiment.
Figure 4:
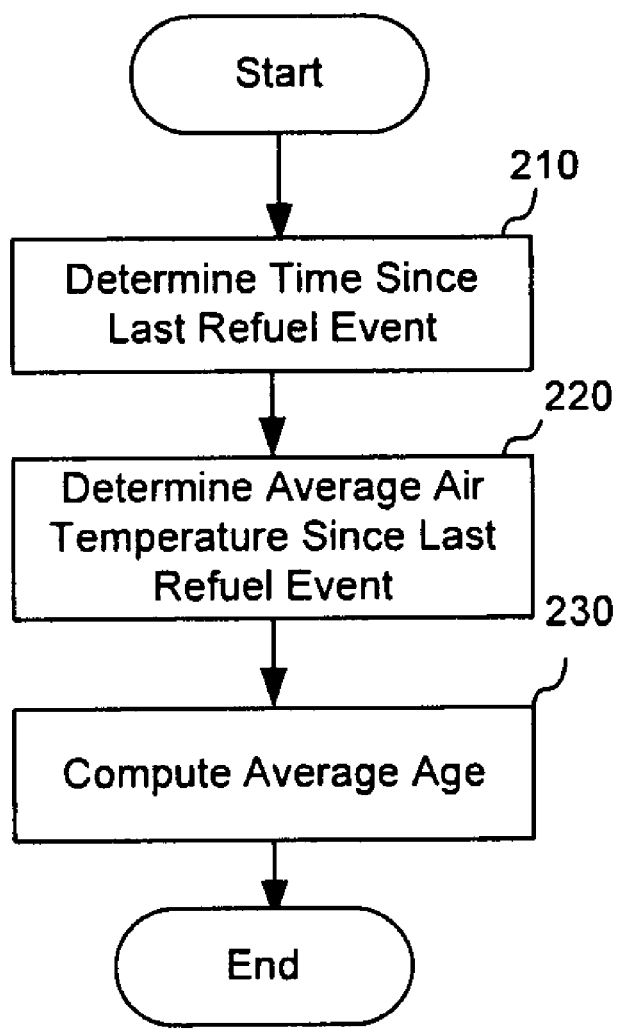

Turning now to FIGS. 3 and 4 and with continued reference to FIG. 2, flowcharts illustrate a fuel stability additive supply control method that can be performed by the control module 28 of FIG. 2 in accordance with various aspects of the present disclosure. As can be appreciated in light of the disclosure, the order of operation within the method is not limited to the sequential execution as illustrated in FIG. 2, but may be performed in one or more varying orders as applicable and in accordance with the present disclosure.

In various embodiments, the method can be scheduled to run based on predetermined events, under specific storage conditions, and/or run continually during operation of the vehicle 10 (FIG. 1). In one example, the method as shown in FIG. 3 is scheduled to run at a power-up of the vehicle 10 (FIG. 1).

In one example, the method may begin at 100. An occurrence of a refuel event is determined at 110. If a refuel event has not occurred at 110, the fuel age 76 is estimated at 120. For example, as shown in FIG. 4, the fuel age 76 is estimated by estimating the time since last refuel event 68 at 210, determining the average air temperature 74 since the last refuel event at 220, and calculating the average fuel age based thereon, for example, using equation 1 above at 230.

The fuel age 76 is then evaluated at 130. If the fuel age 76 is greater than a predetermined threshold (e.g., an equivalent of six months), an additive supply amount is determined based on the current fuel level 60 at 140. The stability fluid is then obtained from the additive fluid storage unit 30 (FIG. 1) and supplied to the fuel storage unit 26 (FIG. 1) by generating the supply control signal 78 to the additive supply system 32 (FIG. 1) at 150. Thereafter, the initial age of the fuel residing in the fuel storage unit 26 (FIG. 1) is reset to a predetermined value (e.g., an equivalent of two months, three months, and/or any other value) at 160 and the method may end at 170.

Otherwise, at 130, if the fuel age 76 is less than the predetermined threshold, the method may end at 170.

At 110, if a refuel event has occurred, the average age of the fuel is estimated at 180. For example, as shown in FIG. 4, the average fuel age is estimated by estimating the time since last refuel event 68 at 210, determining the average air temperature 74 since the last refuel event at 220, and calculating the average fuel age based thereon, for example, using equation 1 above at 230. Thereafter, at 190 of FIG. 3, the fuel age 76 is determined based on a weighted average age. The weighted average age is computed based on the average age, the previous fuel level 58, and the current fuel level 60 using, for example equation 2 above.

The fuel age 76 is then evaluated at 130. If the fuel age 76 is greater than a predetermined threshold (e.g., an equivalent of six months), an additive supply amount is determined based on the current fuel level 60 at 140. The stability fluid amount is then obtained from the additive fluid storage unit 30 (FIG. 1) and supplied to the fuel storage unit 26 (FIG. 1) by generating the supply control signal 78 to the additive supply system 32 (FIG. 1) at 150. Thereafter, the initial age 66 of the fuel residing in the fuel storage unit 26 is reset to a predetermined value (e.g., an equivalent of two months, three months, and/or any other value) at 160 and the method may end at 170.

Otherwise at 130, if the fuel age 76 is less than the predetermined threshold, the method may end at 170.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed as the best mode contemplated for carrying out this invention, but that the invention will include all embodiments falling within the scope of the present application.

What is claimed is:

1. A fuel stabilizer system, comprising:
   a fuel additive storage unit that stores fuel stability fluid;
   a fuel stability fluid supply system that supplies fuel stability fluid from the fuel additive storage unit to a fuel storage unit; and
   a control module that estimates an age of fuel in the fuel storage unit and that selectively controls the fuel stability fluid supply system to supply fuel stability fluid to the fuel storage unit based on the age of the fuel.

2. The system of claim 1 wherein the control module estimates an amount of fuel stability fluid to supply to the fuel storage unit based on a current fill level of fuel in the fuel storage unit.

3. The system of claim 1 wherein the control module estimates the age of the fuel based on a weighted average of new fuel and old fuel in the fuel storage unit.

4. The system of claim 1 wherein the control module estimates the age of the fuel based on ambient air temperature.

5. The system of claim 4 wherein the control module estimates an average ambient air temperature since a last refuel event and wherein the control module further estimates the age of the fuel based on the average ambient air temperature.

6. A vehicle, comprising:
   a fuel storage unit that stores engine fuel;
   a fuel additive storage unit that stores fuel stability fluid;
   a fuel stability fluid supply system that supplies fuel stability fluid from the fuel additive storage unit to the fuel storage unit; and
   a control module that estimates an age of the fuel in the fuel storage unit and that selectively controls the fuel stability fluid supply system to supply fuel stability fluid to the fuel storage unit based on the age of the fuel.

7. The system of claim 6 wherein the control module estimates an amount of fuel stability fluid to supply to the fuel storage unit based on a current fill level of fuel in the fuel storage unit.

8. The system of claim 6 wherein the control module estimates the age of the fuel based on a weighted average of new fuel and old fuel in the fuel storage unit.

9. The system of claim 6 wherein the control module estimates the age of the fuel based on ambient air temperature.

10. The system of claim 9 wherein the control module estimates an average ambient air temperature since a last refuel event and wherein the control module further estimates the age of the fuel based on the average ambient air temperature.

11. A control method for stabilizing fuel, comprising:
    estimating a time since a last refuel event;
    estimating a fuel age based on the time since last refuel event; and
    commanding a supply of fuel stability fluid to a fuel storage unit based on the fuel age.

12. The method of claim 11 further comprising determining a supply amount based on a current fill level of fuel and wherein the commanding the supply of fuel stability fluid is based on the supply amount.

13. The method of claim 11 wherein the estimating the fuel age is further based on an ambient air temperature.

14. The method of claim 13 wherein the estimating the fuel age is further based on a current fill level of the fuel.

15. The method of claim 11 further comprising determining when a refuel event occurs.

16. The method of claim 15 wherein when the refuel event occurs, the estimating the fuel age is based on a weighted average of the fuel age of existing fuel and new fuel.

* * * * *